Sept. 4, 1934.  E. H. ALDEBORGH ET AL  1,972,124
INDICATING LIMIT PLUG GAUGE
Filed May 19, 1932   2 Sheets-Sheet 2
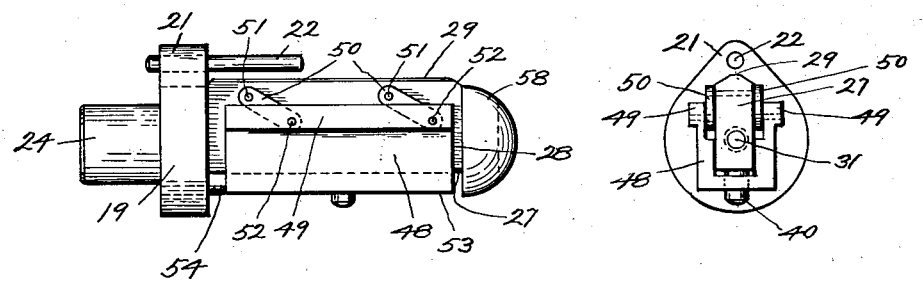
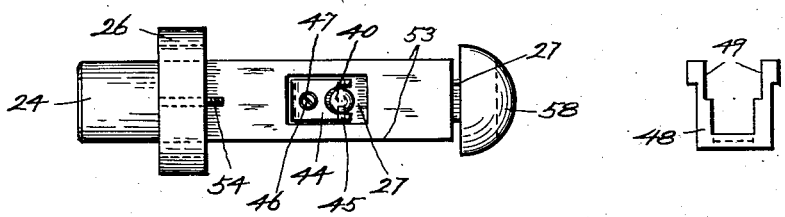
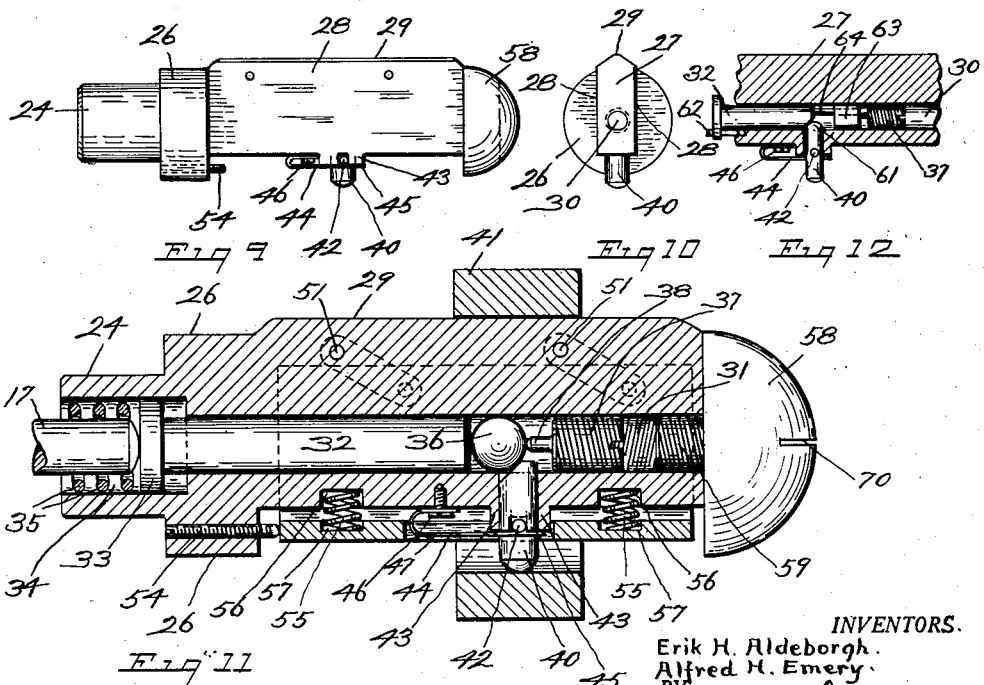
INVENTORS.
Erik H. Aldeborgh.
Alfred H. Emery.
BY John J. Thompson
ATTORNEY.

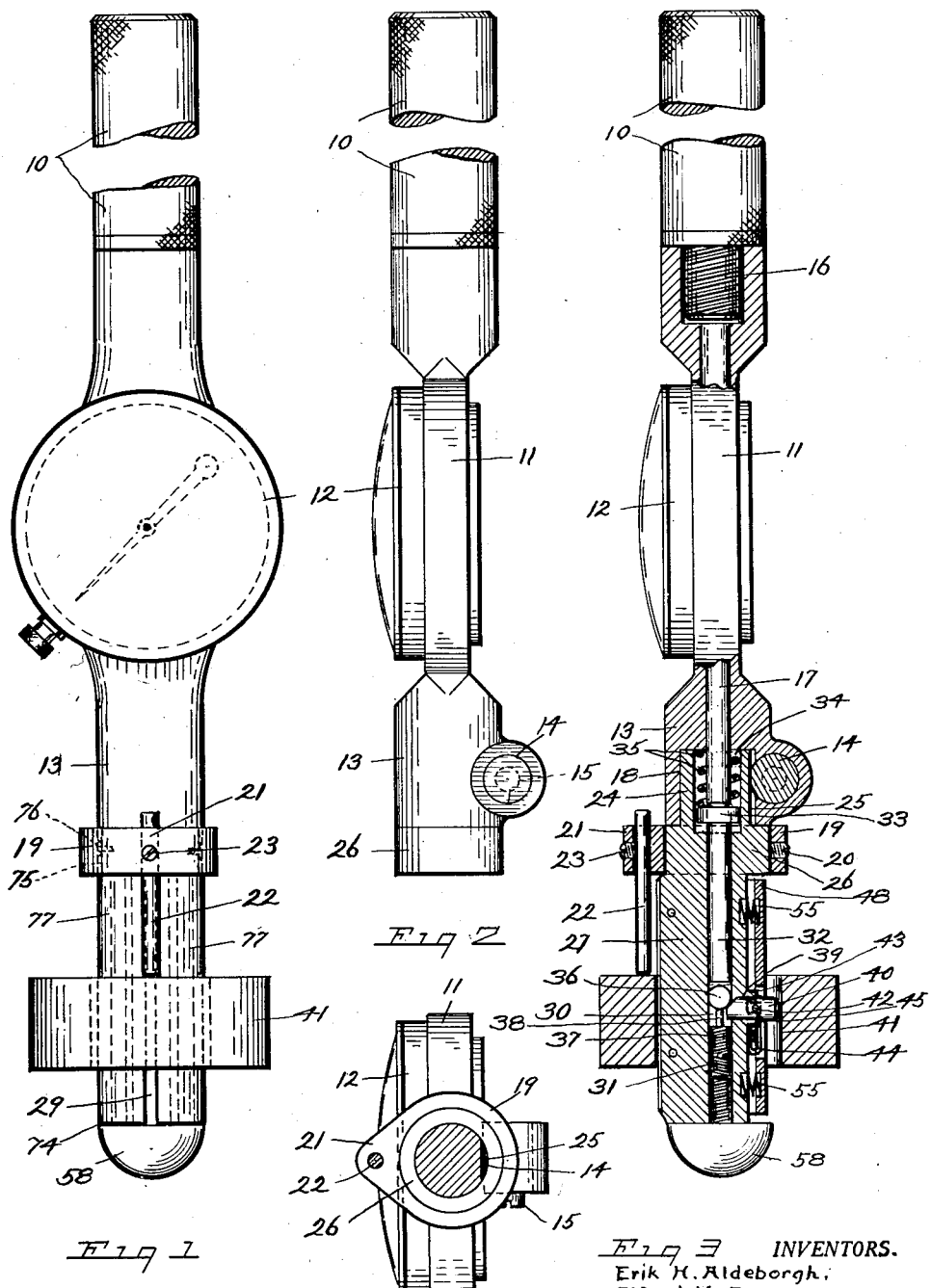

Patented Sept. 4, 1934

1,972,124

UNITED STATES PATENT OFFICE 1,972,124

INDICATING LIMIT PLUG GAUGE

Erik H. Aldeborgh and Alfred H. Emery, Poughkeepsie, N. Y., assignors to The Standard Gage Company, Inc., Poughkeepsie, N. Y., a corporation of New York Application May 19, 1932, Serial No. 612,190

6 Claims. (Cl. 33—178)

This invention relates to an indicating limit plug gauge of that class which is employed for the measuring and checking of bores or internal dimensions, such as rings, ball-races, cylinders, gun barrels, etc., and the invention relates more particularly to an instrument which may be quickly inserted into the bore of the work and even during the rotation of the work in a machine, such as in a lathe or grinder during the process of making the same, and which will not only indicate by a direct reading dial the diameter of the work upon its center line, but will also indicate any "taper", "bell-mouth", or "out of roundness", and will also give a reading "between limits".

The instrument comprises a handle member having mounted thereon in a detachable and interchangeable manner a standard dial indicator, so that dials of different graduations may be employed as desired, and in connection therewith and within the handle member is contained operating mechanism to operate the plunger of the dial indicator and adjusting means therefor, while adjacent thereto and to said handle member is detachably and interchangeably secured a plug gauging unit which contains means for both self-alining the work on the instrument and for measuring the diameter of the bore and centering the work with respect to the axis of the bore of the work.

The work being alined and centered on the instrument before it is brought into contact with the measuring means (which is independent from that of the alining and centering means) so that the plunger of the dial indicator is operated by the measuring means on the true center line of the bore of the work and at right angles to said bore, as no true measurement can be obtained by a three point contact within a bore.

While there are instruments for alining work to be measured on their bore or internal diameters, they centralize the work upon three points, one of which points is also used as a measuring point and no provision is made to prevent the work from rocking on the points, or to bring the bore of the work into parallel relation with the axis of the instrument and thus obtain a true measurement of the diameter through the center line and at right angles to the bore of the work, and at the same time or in a simultaneous manner.

Furthermore there is no instrument of this kind that will give a measurement between limits of tolerance, as in the usual plug gauge where one end is used to indicate the "go" or minimum diameter, and the other end to indicate the "no go" or maximum diameter, it requires two operations to gauge a single piece of work, and the life of such a gauge is very short, while with the type of instrument herewith shown and described, the work contacting edges may be adjusted to compensate for wear thus assuring long life.

In the instrument forming the subject matter of this patent it is possible to design the same so that several gauging units having different ranges may be used with the same handle member so that bores from say, one-half inch in diameter to those of several inches in diameter may be checked, as well as cylinders of any length.

Also a dial indicator may be employed having graduations showing the tolerance of limits desired, so that as the instrument is contacted with the bore of the work a direct reading will be given showing if the bore is within the limits desired, thus making it possible for the operator to determine in grinding a bore as to how much more material should be removed.

The handle member carrying the dial indicator and gauging unit may if desired be mounted on a suitable stand and used as a comparator gauge, or the handle may be mounted in any desired fixture or machine, or the instrument may be used in the hand and the work placed thereon and removed in a rapid manner, the balance in either case being all that is required.

The objects of the invention are to provide an instrument for the measurement of internal diameters which will take the place of the usual plug gauge and the like, and that will give a direct reading upon a graduated dial and within limits as desired.

Another object of the invention is to provide in an instrument of this kind, a handle member in which is mounted a standard dial indicator with its operating mechanism, and to which may be attached in an interchangeable manner gauging units of different ranges in size so that a single handle and dial indicator may be used with several different sizes of gauging units for different kinds of work.

A further object of the invention is to provide gauging units which are provided with means for self-alining the work thereon, both with respect to its axis and with respect to its measuring contacts and bringing the same to its true center line in a simultaneous manner.

Another object being to provide in a gauging unit, means for measuring the internal diameter on the center line and at right angles to the bore of the work in an independent manner from the work aligning means, but in a simultaneous manner therewith.

A still further object being in a gauging unit to provide means whereby the alining edges are at all times and under all conditions retained in parallel relation with each other and with the bore of the work.

Another object being to provide means whereby the moving parts of the instrument are protected from dirt and foreign matter.

With these and other objects in view, our invention consists in certain novel construction and combination of parts as will hereinafter be fully described and claimed, and illustrated in the accompanying drawings in which like figures of reference refer to corresponding parts in all of the views, but it is understood that slight changes may be made without departing from the spirit of the invention.

In the drawings—

Figure 1 is a top plan view of the instrument and shows the same with a piece of work in the form of a ring placed thereon in position for measuring.

Figure 2 is a side elevation of the same with the gauging unit removed therefrom.

Figure 3 is a similar side elevation, partly in section and showing the method of mounting the gauging unit in the handle member.

Figure 4 shows an end view of Figure 2.

Figure 5 shows a side elevation of the gauging unit.

Figure 6 shows an end view of the same.

Figure 7 shows a bottom view of the gauging unit.

Figure 8 shows an end view of the self-alining member as removed from the body member.

Figure 9 shows a side elevation of the gauging unit with the self-alining movable member removed therefrom.

Figure 10 shows an end view of Figure 9.

Figure 11 shows an enlarged sectional view of the unit illustrating the arrangement of the parts.

Figure 12 shows a modification of the contact operating mechanism as used with units of small size.

While we have here shown the handle member 10 as formed with a body 11, within which is mounted a dial indicator 12, and having a socket end 13 within which is detachably mounted the gauging unit, which is locked therein by some well known means such as a plug 14 and screw 15; it is understood that any desired form of handle or other mounting may be used, and if desired the handle may be in the form of a long rod to allow the instrument to be inserted into a long cylindrical piece of work such as a gun barrel, or in place of the dial indicator as shown, a 90-degree dial indicator may be mounted upon the end of the handle 10 so that the instrument may be inserted into cylinders with the dial at all times in sight; also in place of the socket 13, any desired means may be employed to attach the gauging units.

Referring to Figure 3, it will be seen that the handle 10 is attached to the body 11 by a threaded end 16, and that the operating plunger 17 of the dial indicator 12 extends into a bore 18 which is formed in the socket end 13, and is in contact with and may be operated by suitable mechanism mounted in the gauging unit, hereinafter described in detail.

The instrument is further provided with an adjustable work stop in the form of a ring 19 which is mounted on the collar 26 of the gauging unit by the set screw 20, and is provided with an ear 21 within which is slidably mounted a stop rod 22 which is locked in position by the set screw 23.

The gauging unit comprises a circular shank 24 which is flatted as at 25, and which is adapted to be held in the socket 13 by the action of the plug 14 which is formed with a flatted and tapered side in contact with the flatted side 25 and held by the screw 23, or by some other suitable means, and integral with said shank 24 is formed a collar 26 upon which is mounted the stop ring 19, and also integral with said shank 24 and the collar 26 is formed the body member 27 which is formed with the two parallel and flatted sides 28 and the upper combined work engaging and gauging edge 29, as shown in Figures 9 and 10.

Said body member 27 is formed with a longitudinal bore 30 extending therethrough in coaxial relation with the collar 26 and shank 24, and this bore 30, adjacent the outer end is provided with the screw threads 31.

Mounted within said bore 30 is a plunger 32 which is formed with a head 33 placed within the counterbore 34 in the shank 24 and in contact with the plunger 17 of the dial indicator, and also in contact with a spring 35 contained within said counterbore 34.

Also mounted within said bore 30 and in contact with the end of the operating plunger 32 is placed a ball 36, its position being regulated by a plug 37 which is threaded within said bore 30 and which is formed with a pilot end 38 in contact with the ball 36, and said adjusting plug 37 may be sealed in position in the usual manner by wax if desired.

At right angles to the bore 30 and formed in the body member 27, is a bore 39 within which is slidably mounted the contact plunger 40 which is formed on its inner end with a 45-degree beveled face which is in contact with the ball 36 in such a manner that the ball 36 will be moved in the bore 30, and by it the operating plunger 32, exactly the same distance that the contact plunger 40 is moved inward by contact with the inner wall 41, as it is brought into contact therewith.

To prevent the rotation of the contact plunger 40 the same is provided with a cross pin 42 which has its ends in contact with the bosses 43 which are formed on the lower part of the body member 27, thus preventing the turning of said contact plunger 40.

To hold said contact plunger 40 in place and in contact with the ball 36, a spring 44 is provided which is formed with a bifurcated end 45 which rests upon the cross pin 42 and embraces the plunger 40, while the other end of said spring 44 is formed with a return bend which is secured to the body member 27 by a screw 46, the head of which may be reached through a clearance hole 47 formed in the body of said spring 44, this being shown in Figure 7.

As shown in Figure 12, in the smaller sizes of gauging units the ball 36 may be eliminated, and the inner end of the contact plunger 40 be formed with a rounded end 61 in contact with a 45-degree bevel formed on the end of the operating plunger 32, said plunger 32 being prevented from turning by a pin 62 through the head thereof acting as a key; adjacent the operating plunger 32 and the contact plunger 40, there is provided a plug 63 which is pressed into the bore 30 and which is provided with a longitudinal hole therethrough off center and within which is slidably mounted a pin 64 with its end in contact with the end of the operating plunger 32 and spaced from the end of the plunger 40; said adjusting pin 64 being backed up and moved by the threaded plug 37.

In connection with the combined self-alining and gauging edge 29 of the body member 27, there is provided a movable self-alining member 48, which is channel-shaped in cross section as shown in Figure 8, and which is mounted upon the body member 27 as shown in Figures 5 and 6, in such a manner that its alining edges 53 are always held in parallel relation with the alining edge 29, while said movable member 48 has a limited movement with respect to the body member 27 to vary the distance between the alining edges 29 and 53 as the work is placed thereon.

The upper and inner portion of the sides of the movable self-alining member is cut away as at 49 to provide an opening between said sides 49 and the flatted sides 28 of the body member 27, and within these openings or spaces are placed a series of links 50, set at an angle, and having their upper ends secured upon the ends of the transverse pins 51 which are freely movable in the body member 27.

The lower ends of said links 50 are secured on the ends of the pins 52 which are freely mounted in the sides 49 of the movable member 48, thus providing a long bearing for the pins, and mounting the member 48 to the body member 27 in such a manner that the movable member 48 may be moved in parallel relation with the body member 27 as the unit is inserted into and withdrawn from the bore of the work; said self-alining movable member being slightly shorter in length than the body member 27 to allow for this movement.

For normally retaining the members 27 and 48 in an expanded position which is limited by an adjustable stop screw 54 which is threaded through the collar 36 with its end adapted to contact with the rear end of the movable member 48; there is provided the springs 55 which are placed between the lower face of the body member 27 and the inner face of the movable member 48, in the counterbores 56 and 57 in such a manner as to allow of the slight sliding movement between the members 27 and 48 as the member 48 is moved.

To facilitate the entering of the instrument into the bores of the work, while the work is being rotated, and to provide a quick means of placing the work upon the instrument, the end of the gauging unit is provided with a round or conical shaped nose piece 58 which is retained thereon by a stud 59 threaded into the bore 30; the nose piece being provided with a screw-driver slot 70 by which it is removed or attached.

It will be seen by referring to Figure 11, that the movement of the ball and the operating plunger 32 are regulated by the relative position of the beveled face 71 of the contact plunger 40 with respect to the ball 36, and that by moving the adjusting plug 37 both the movement of the contact plunger 40 and the movement of the operating plunger 32 may be regulated.

Also the movement between the body member 27 and the movable self-alining member 48 may be regulated by the stop screw 54 so that where the limits to be gauged are within a small range, undue movement of the movable member 48 is prevented thus reducing friction between the alining edges and the bore of the work as the same are brought into contact.

To protect the gauging unit from collecting dirt, etc., it is provided with a shield 77 which is formed from a piece of thin material and has an end 74 formed with a hole for the stud 59 to pass through and held between the inner face of the nose piece 58 and the end of the unit 27, while the sides are bent back and cover the openings between the body member 27 and the sides of the movable member 48 over the links 50, while the ends 75 are held under the collar 19 by the screws 76.

In the operation of the instrument, the handle member 10 is held in the hand of the operator with the dial indicator in the proper position, and the work, here shown as a ring, is placed thereon by inserting the nose piece 58 in the bore and sliding the work upon the self-alining edges 29 and 53 which alines the work on the unit; then by pushing the work further on until it contacts with the stop rod 22, and has come into contact with the measuring contact plunger 40, which through the ball 36 and operating plunger 32 will operate the plunger 17 of the dial indicator 12 to register the true diameter taken on the center line of the work and at right angles to the axis of the bore of the work; the act of alining the work and measuring its diameter being accomplished in a simultaneous manner and with great speed.

Having thus described our invention, what we claim as new and desire to secure by Letters Patent, is—

1. An indicating plug gauge comprising a body having a work alining straight edge, a positioning member having parallel work alining straight edges, means for pivotally connecting said member to said body to maintain the member with its said edges constantly parallel to said edge during all movements of the member toward and from said body, yielding means for holding said member normally separated from said body, measuring means including a plunger slidable in said body toward and from said edge and at right angles to a plane passed through said edges to indicate the distance between said edge and the outer end of said plunger.

2. An indicating plug gauge comprising a body having a work alining straight edge, a positioning member having parallel work alining straight edges, means for pivotally connecting said member to said body to maintain the member with its said edges constantly parallel to said edge during all movements of the member toward and from said body, yielding means for holding said member normally separated from said body, measuring means including a plunger slidable in said body toward and from said edge and at right angles to a plane passed through said edges to indicate the distance between said edge and the outer end of said plunger and means for limiting the outward movement of said member relative to said body.

3. An indicating plug gauge comprising a body having a work alining straight edge, a positioning member having parallel work alining straight edges, means for pivotally connecting said member to said body to maintain the member with its said edges constantly parallel to said edge during all movements of the member toward and from said body, yielding means for holding said member normally separated from said body, measuring means including a plunger slidable in said body toward and from said edge and at right angles to a plane passed through said edges to indicate the distance between said edge and the outer end of said plunger and means adjustable on said body to limit the outward movement of said member relative to said body.

4. An indicating plug gauge comprising a body having a work alining straight edge, a positioning member having parallel work alining straight edges, means for pivotally connecting said member to said body to maintain the member with its said edges constantly parallel to said edge during all movements of the member toward and from said body, yielding means for holding said member normally separated from said body, measuring means including a plunger slidable in said body toward and from said edge and at right angles to a plane passed through said edges to indicate the distance between said edge and the outer end of said plunger, and a stop adjustable lengthwise of said body to limit the movement of the work in one direction along said work alining edges.

5. An indicating plug gauge comprising a body having a work alining straight edge, a positioning member having parallel work alining straight edges, means for pivotally connecting said member to said body to maintain the member with its said edges constantly parallel to said edge during all movements of the member toward and from said body, yielding means for holding said member normally separated from said body, measuring means including a plunger slidable in said body toward and from said edge and at right angles to a plane passed through said edges to indicate the distance between said edge and the outer end of said plunger, a stop adjustable lengthwise of said body to limit the movement of the work in one direction along said work alining edges, and means adjustable on said body to limit the outward movement of said member relative to said body.

6. An indicating plug gauge comprising a body having a work alining straight edge, a stop adjustable on said body to limit the insertion thereof into the bore of the work, a member having parallel work alining straight edges formed thereon, parallel links connecting opposite sides of said member pivotally to said body to maintain said edges constantly parallel to said edge throughout all movement of the member toward and from said body, yielding means interposed between said body and member for holding the member normally away from the body, and measuring means including a plunger slidable in said body toward and from said straight edge and between said straight edges to indicate the distance between said edge and the outer end of said plunger.

ERIK H. ALDEBORGH.
ALFRED H. EMERY.